(12) United States Patent
Xu et al.

(10) Patent No.: US 10,996,505 B2
(45) Date of Patent: May 4, 2021

(54) COLOR FILM SUBSTRATE, LIQUID CRYSTAL DISPLAY PANEL AND LIQUID CRYSTAL DISPLAY

(71) Applicants: BOE Technology Group Co., Ltd., Beijing (CN); Chengdu BOE Optoelectronics Technology Co., Ltd., Sichuan (CN)

(72) Inventors: Yuanjie Xu, Beijing (CN); Pengcheng Zang, Beijing (CN)

(73) Assignees: BOE Technology Group., Ltd., Beijing (CN); Chengdu BOE Optoelectronics Technology Co., Ltd., Sichuan (CN)

( * ) Notice: Subject to any disclaimer, the term of this patent is extended or adjusted under 35 U.S.C. 154(b) by 385 days.

(21) Appl. No.: 16/070,684

(22) PCT Filed: Jan. 2, 2018

(86) PCT No.: PCT/CN2018/070058
§ 371 (c)(1),
(2) Date: Jul. 17, 2018

(87) PCT Pub. No.: WO2018/218965
PCT Pub. Date: Dec. 6, 2018

(65) Prior Publication Data
US 2020/0393721 A1    Dec. 17, 2020

(30) Foreign Application Priority Data
May 27, 2017    (CN) .......................... 201710392985.0

(51) Int. Cl.
G02F 1/1335    (2006.01)
(52) U.S. Cl.
CPC .. G02F 1/133514 (2013.01); G02F 1/133512 (2013.01)

(58) Field of Classification Search
CPC ................................................ G02F 1/133514
See application file for complete search history.

(56) References Cited

U.S. PATENT DOCUMENTS

2007/0188696 A1    8/2007    Kim et al.
2007/0196940 A1*    8/2007    Park .................. G02F 1/133516
                                                                                                    438/22
(Continued)

FOREIGN PATENT DOCUMENTS

CN          101133434 A      2/2008
CN          103150965 A      6/2013
(Continued)

OTHER PUBLICATIONS

Chinese Office Action dated Oct. 9, 2019 for corresponding application CN 201710392985.0.
(Continued)

*Primary Examiner* — Edmond C Lau
(74) *Attorney, Agent, or Firm* — Arent Fox LLP; Michael Fainberg

(57) ABSTRACT

Embodiments of the present disclosure provide a color film substrate, a liquid crystal display panel and a liquid crystal display, wherein the color film substrate includes a base substrate and a photoresist layer formed on the base substrate, the photoresist layer includes a plurality of recess parts, each of the plurality of recess parts has an opening facing away from the base substrate and a lateral surface with a step structure, and an orthographic projection of the opening of each of the plurality of recess parts onto the base substrate overlaps with an orthographic projection of a bottom of each of the plurality of recess parts onto the base substrate.

18 Claims, 7 Drawing Sheets

(56) References Cited

U.S. PATENT DOCUMENTS

| | | |
|---|---|---|
| 2008/0055831 A1 | 3/2008 | Satoh |
| 2015/0205019 A1* | 7/2015 | Kawanishi ................ G03F 1/00 359/885 |
| 2016/0041416 A1 | 2/2016 | Zhang et al. |
| 2016/0218305 A1 | 7/2016 | Kim et al. |
| 2017/0054106 A1 | 2/2017 | Jeon |
| 2017/0271623 A1 | 9/2017 | Wang et al. |

FOREIGN PATENT DOCUMENTS

| | | |
|---|---|---|
| CN | 103760719 A | 4/2014 |
| CN | 103777399 A | 5/2014 |
| CN | 105826350 A | 8/2016 |
| CN | 205679893 U | 11/2016 |
| CN | 106684256 A | 5/2017 |
| CN | 107490892 A | 12/2017 |

OTHER PUBLICATIONS

International Search Report PCT/CN2018/070058 dated Mar. 27, 2018.

\* cited by examiner

COLOR FILM SUBSTRATE, LIQUID CRYSTAL DISPLAY PANEL AND LIQUID CRYSTAL DISPLAY

This application is a National Stage of International Application No. PCT/CN2018/070058, filed Jan. 2, 2018, which claims priority to Chinese Patent Application No. 201710392985.0, filed May 27, 2017, both of which are hereby incorporated by reference in their entireties.

TECHNICAL FIELD

The present disclosure relates to the field of display technologies, and particularly to a color film substrate, a liquid crystal display panel and a liquid crystal display.

BACKGROUND

A flexible display can be defined as a flat panel display manufactured with a very thin flexible substrate, and it can bend to such a degree that the curvature radius is only several centimeters or even less without impairing its functions. And through the struggling development of numerous researchers and engineers, the flexible display technology has developed rapidly, and has become a display technology with a bright prospect.

In recent years, the flexible display technology has made great progress, and has been widely used in display products, especially in mobile communication devices. At present, the research and application achievements of the flexible display technology mainly include the flexible organic light emitting diode (FOLED for short), the flexible electronic ink display, also known as the flexible electrophoretic display (FEPD for short), and the flexible liquid crystal display (FLCD for short). Compared with the liquid crystal display technology and the plasma display technology which serve as a flat panel display, the flexible display technology has the advantages of ultrathin design, light weight, durability, large storage capacity, free design and capability of being wound.

However, for the moment, the flexible display technology is still confronted with numerous problems in substrate materials, liquid crystal materials and manufacturing processes, among which the problem of cracks on a photoresist layer of a flexible panel urgently needs to be solved, since the photoresist layer has a large area, when the flexible panel is folded, the stress is concentrated, and cracks are easily generated, thereby leading to poor quality of a display frame.

SUMMARY

At least one embodiment of the present disclosure provides a color film substrate including a base substrate and a photoresist layer formed on the base substrate, wherein the photoresist layer includes a plurality of recess parts, each of the plurality of recess parts has an opening facing away from the base substrate and a lateral surface with a step structure, and an orthographic projection of the opening of each of the plurality of recess parts onto the base substrate overlaps with an orthographic projection of a bottom of each of the plurality of recess parts onto the base substrate.

In some embodiments of the present disclosure, the photoresist layer includes a plurality of color photoresists and a black photoresist arranged between two adjacent color photoresists; the plurality of recess parts are arranged on the color photoresists; or the plurality of recess parts are arranged on the black photoresist; or the plurality of recess parts are arranged on the color photoresists and the black photoresist.

In some embodiments of the present disclosure, at least one recess part among the plurality of recess parts extends through the photoresist layer.

In some embodiments of the present disclosure, a cross section of each of the plurality of recess parts paralleled with the base substrate shapes as a circle, an oval, or a triangle.

In some embodiments of the present disclosure, the plurality of recess parts constitute several recess part columns; recess parts of two adjacent recess part columns are aligned with each other in a row direction, or the recess parts of two adjacent recess part columns are staggered with each other in a column direction.

In some embodiments of the present disclosure, when the recess parts of two adjacent recess part columns are staggered with each other in the column direction, spacing between two adjacent recess parts in each of the plurality of recess parts column is L, and the recess parts of two adjacent recess part columns are staggered by a distance of L/2 in the column direction.

In some embodiments of the present disclosure, spacing D between two adjacent recess part columns in a row direction is equal to $(\sqrt{3}/2)$ L.

In some embodiments of the present disclosure, spacing D between two adjacent recess part columns in a row direction is equal to $L*D_0/(2L_0)$, wherein $L_0$ is a size of a long edge of the photoresist layer, and $D_0$ is a size of a wide edge of the photoresist layer.

In some embodiments of the present disclosure, the photoresist layer includes a plurality of color photoresists and a black photoresist arranged between two adjacent color photoresists; the lateral surface of each of the plurality of recess parts is constituted by a lateral surface of an adjacent color photoresist, and the bottom of each of the plurality of recess parts is the black photoresist.

In some embodiments of the present disclosure, a maximum distance between a surface of a side, facing away from the base substrate, of the color photoresist and the base substrate is greater than a distance between a surface of a side, facing away from the base substrate, of the black photoresist and the base substrate.

At least one embodiment of the present disclosure provides a liquid crystal display panel, including the color film substrate according to the embodiments of the present disclosure above.

At least one embodiment of the present disclosure provides a liquid crystal display, including the liquid crystal display panel according to the embodiments of the present disclosure above.

BRIEF DESCRIPTION OF THE DRAWINGS

In order to make the technical solutions according to the embodiments of the present disclosure more apparent, the drawings to which a description of the embodiments refers will be briefly introduced below, and apparently the drawings to be described below are merely illustrative of some of the embodiments of the present disclosure, and those ordinarily skilled in the art can derive from these drawings other drawings without any inventive effort.

DETAILED DESCRIPTION OF THE EMBODIMENTS

In order to make the objects, technical solutions, and advantages of the embodiments of the present disclosure more apparent, the technical solutions according to the embodiments of the present disclosure will be described below clearly and fully with reference to the drawings in the embodiments of the present disclosure, and apparently the embodiments described below are only a part but not all of the embodiments of the present disclosure. Based upon the embodiments here of the present disclosure, all the other embodiments which can occur to those skilled in the art without any inventive effort shall fall into the scope of the present disclosure.

Figure 1:
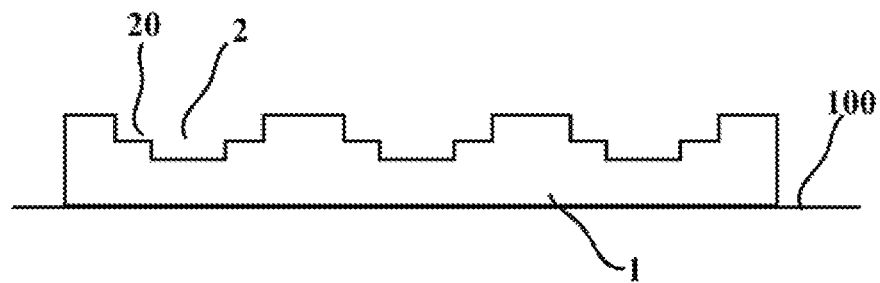
FIG. 1 is a schematic diagram of a cross section of a photoresist layer according to an embodiment of the present disclosure.

As illustrated in FIG. 1, a color film substrate according to the embodiments of the present disclosure includes a base substrate 100 and a photoresist layer 1 formed on the base substrate 100, wherein the photoresist layer 1 includes a plurality of recess parts 2, each of the plurality of recess parts 2 has an opening facing away from the base substrate 100 and a lateral surface with a step structure 20, and an orthographic projection of the opening of each of the plurality of recess parts 2 onto the base substrate 100 overlaps with an orthographic projection of a bottom of each of the plurality of recess parts 2 onto the base substrate 100.

In the color film substrate above, since the lateral surface (s) of each of the plurality of recess parts 2 is (or are) provided with the step structure (s) 20, and a size of the opening of each of the plurality of recess parts 2 is greater than a size of the bottom of each of the plurality of recess parts 2, namely, the orthographic projection of the opening of each of the plurality of recess parts 2 onto the base substrate 100 overlaps with the orthographic projection of the bottom of each of the plurality of recess parts 2 onto the base substrate 100; when the color film substrate bends, a step at a bottom layer of the step structure 20 will bear a greater stress, thus dispersing the stress concentrated on the photoresist layer 1. If the stress on the photoresist layer is too large, then cracks are firstly generated in the step at the bottom layer of the step structure 20. At this time, since a step at an upper layer overlaps with the step at the bottom layer, so the propagation of cracks can be delayed, and the structural life of the photoresist layer 1 can be prolonged.

In the color film substrate according to the embodiments of the present disclosure, recess parts 2 with the lateral surface (s) having the step structure (s) 20 are arranged on the photoresist layer 1, thereby changing the stress condition of the photoresist layer 1 under a bent state, and no additional anti-cracking protection layer needs to be arranged on the photoresist layer 1 of the color film substrate, thus the technological process is simplified, thereby improving the manufacturing efficiency and lowering the production cost.

In the embodiments of the present disclosure, the photoresist layer 1 includes a plurality of color photoresists which allow part of light to pass through, and a black photoresist which is arranged between two adjacent color photoresists and is configured to block light.

In the embodiments of the present disclosure, the structures of the recess parts 2 on the photoresist layer 1 are not limited, and any of the following structures can be adopted.

Projections of the plurality of recess parts 2 onto the base substrate 100 are only located in a light transmitting area of the color film substrate, namely, the plurality of recess parts 2 are only arranged on the color photoresists.

The projections of the plurality of recess parts 2 onto the base substrate 100 are only located in a light proof area of the color film substrate, namely, the plurality of recess parts 2 are only arranged on the black photoresist (s).

Part of the projections of the plurality of recess parts 2 onto the base substrate 100 is located in the light proof area of the color film substrate, while the other part is located in the light transmitting area of the color film substrate, namely, the plurality of recess parts 2 are arranged on the black photoresist (s) and the color photoresists.

Figure 2:
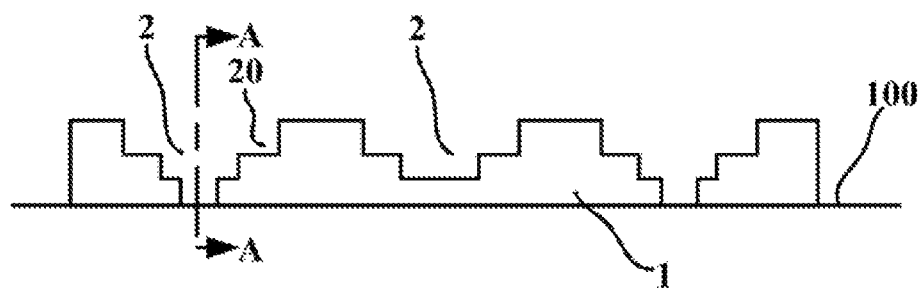
FIG. 2 is a schematic diagram of a cross section of a photoresist layer according to another embodiment of the present disclosure.

As illustrated in FIG. 2, in some embodiments of the present disclosure, at least one recess part 2 among the plurality of recess parts 2 extends through the photoresist layer 1. This structural design enables that more layers of steps are contained in the step structure (s) 20 of the lateral surface (s) of the recess part 2.

Figure 3:
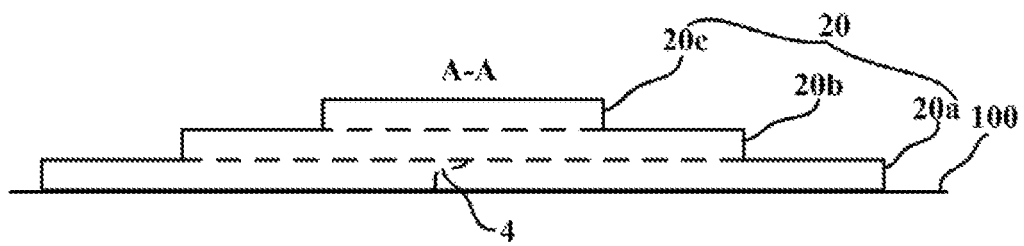
FIG. 3 is a schematic diagram of a cross section along a A-A direction in FIG. 2 (i.e. a schematic diagram of a step structure generating cracks of a photoresist layer)

As illustrated in FIG. 3, the step structure 20 includes three layers of steps, which are respectively a step 20a, a step 20b and a step 20c. When the photoresist layer bends excessively, cracks 4 are generated in the step 20a, since the step 20b partly overlaps with the step 20a, further propagation of the cracks 4 can be postponed; when the cracks of the step 20a propagates to the step 20b, since the step 20c partly overlaps with the step 20b, further propagation of the cracks can be delayed. Based on this rule, along a direction away from the base substrate 100, the step at the upper layer plays a role of covering and delaying the propagation of cracks on the step at the lower layer, therefore, the more the layers of the steps are, the better the coverage effect between the steps is, and the longer the structural life of the photoresist layer 1 is.

In the embodiments of the present disclosure, the shape of each of the plurality of recess parts 2 is not limited. For example, a cross section of each of the plurality of recess parts 2 paralleled with the base substrate 100 shapes as a circle, an oval, or a triangle, etc. And the shape of each of the plurality of recess parts 2 can be designed selectively based on a designed size of a liquid crystal display panel and a designed size of a sub-pixel. Therefore, the photoresist layer 1 in the embodiments of the present disclosure is applicable in a wider scope of application.

In the embodiments of the present disclosure, the arrangement modes of the recess parts 2 on the photoresist layer 1 are not limited, and any of the following arrangement modes below can be adopted.

Figure 4:
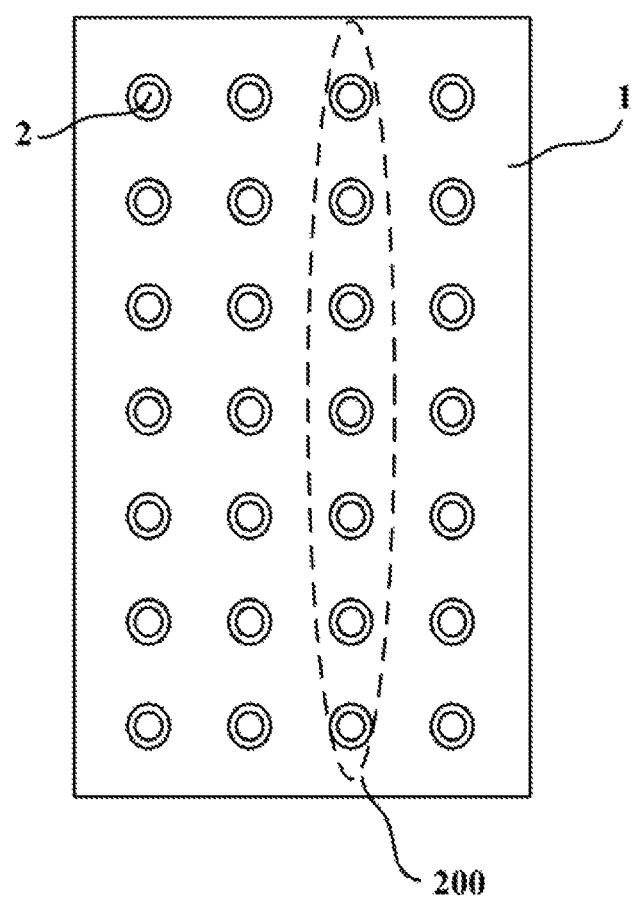
FIG. 4 is a top view of a photoresist layer according to an embodiment of the present disclosure.

As illustrated in FIG. 4, the plurality of recess parts 2 constitute several recess part columns 200, and recess parts 2 of two adjacent recess part columns 200 are aligned with each other in a row direction.

Figure 5:
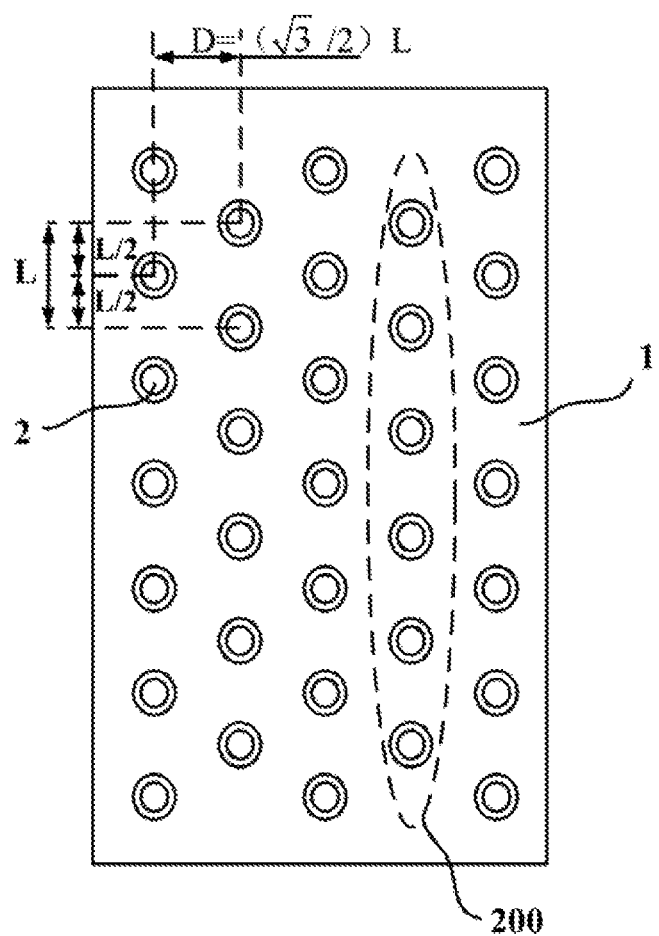
FIG. 5 is a top view of a photoresist layer according to another embodiment of the present disclosure.

As illustrated in FIG. 5, the plurality of recess parts 2 constitute several recess part columns 200, and recess parts 2 of two adjacent recess part columns 200 are staggered with each other in a column direction.

Through the two arrangement modes above, the recess parts 2 can be distributed evenly, so that the stress condition of the photoresist layer 1 when the photoresist layer bends can be better improved, the stress can be dispersed; meanwhile, the design and manufacturing of the photoresist layer 1 are simpler with higher process feasibility.

As illustrated in FIG. 5, the recess parts 2 of two adjacent recess part columns 200 are staggered with each other in the column direction, the spacing between any two adjacent recess parts 2 in each of the plurality of recess parts column 200 is L, and the recess parts 2 of two adjacent recess part columns 200 are staggered by a distance of L/2 in the column direction. By such a design, the distribution of the recess parts 2 can be more even, the stress condition of the photoresist layer 1 when the photoresist layer bends can be better improved, and the stress can be dispersed, so as to reduce the generation of cracks.

By setting related parameters, when the photoresist layer 1 is under a bent state, the recess parts 2 can better disperse the stress on the photoresist layer 1.

For an example, as illustrated in FIG. 5, in some embodiments, the spacing D between two adjacent recess part columns 200 in the row direction is equal to $(\sqrt{3}/2)$ L.

Figure 6:
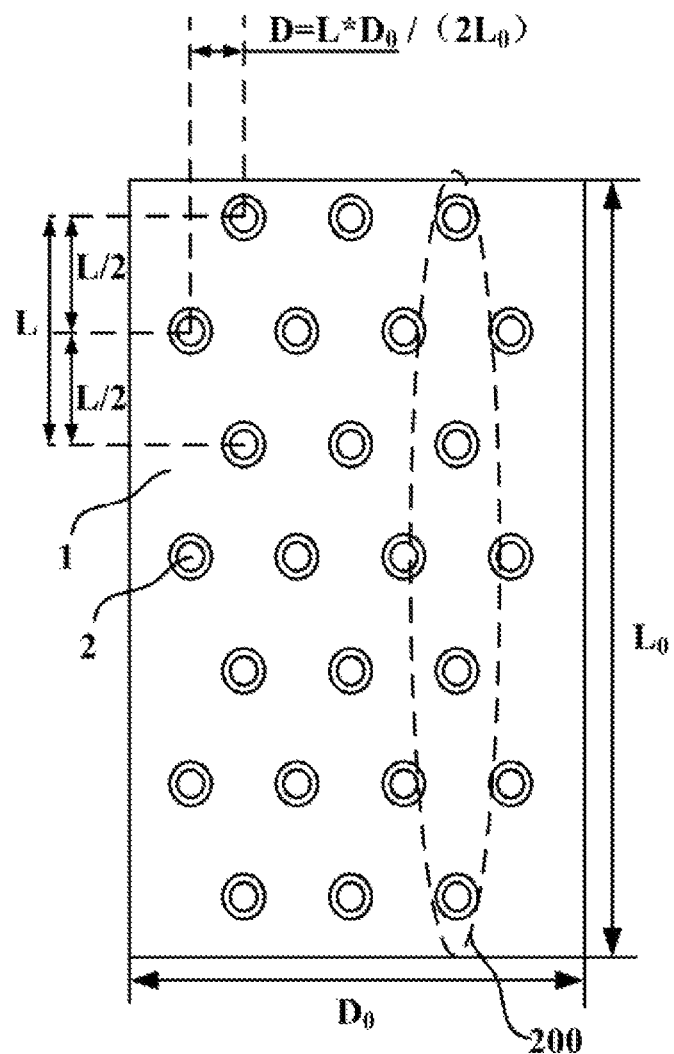
FIG. 6 is a top view of a photoresist layer according to still another embodiment of the present disclosure.

For another example, as illustrated in FIG. 6, in some embodiments, the spacing D between two adjacent recess part columns 200 in the row direction is equal to $L*D_0/(2L_0)$, wherein $L_0$ is a size of a long edge of the photoresist layer 1, and $D_0$ is a size of a wide edge of the photoresist layer 1.

By adopting the design solution of the embodiment illustrated by FIG. 6, the stress on the sub-pixel of the color film substrate is the same as the proportion of the stress on the screen along the long edge direction to the stress on the screen along the wide edge direction, when the screen bends, therefore, the stress can be better remitted.

Figure 7:
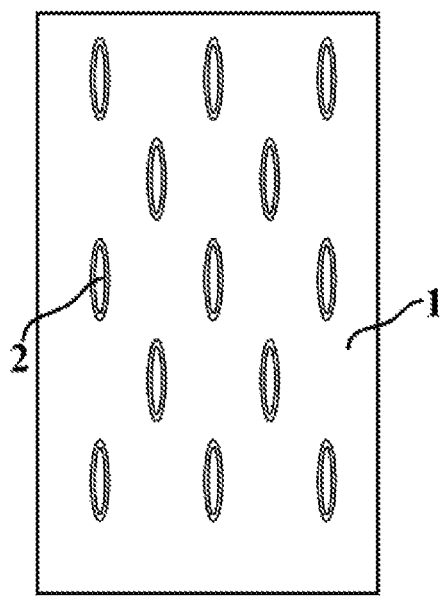
FIG. 7 is a top view of a photoresist layer according to a further embodiment of the present disclosure.
Figure 8:
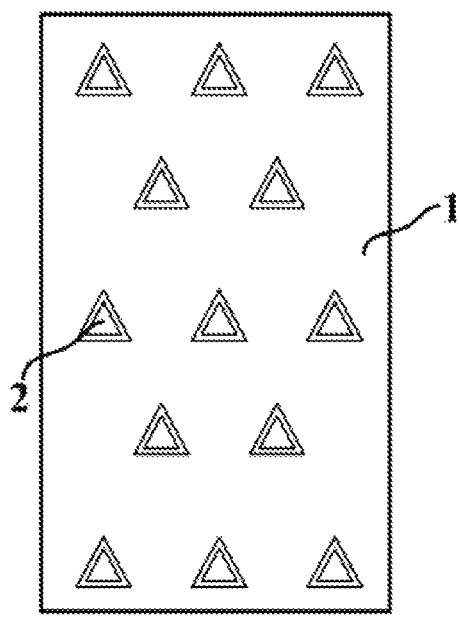
FIG. 8 is a top view of a photoresist layer according to some other embodiment of the present disclosure.

As illustrated in FIG. 7 and FIG. 8, in these two embodiments, the cross sections of the recess parts 2 paralleled with the base substrate are elliptical and triangular respectively. It shall be noted that, when the recess parts 2 adopt other arrangement modes, the shapes of the cross sections of the recess parts 2 can also be modified correspondingly.

Figure 9:
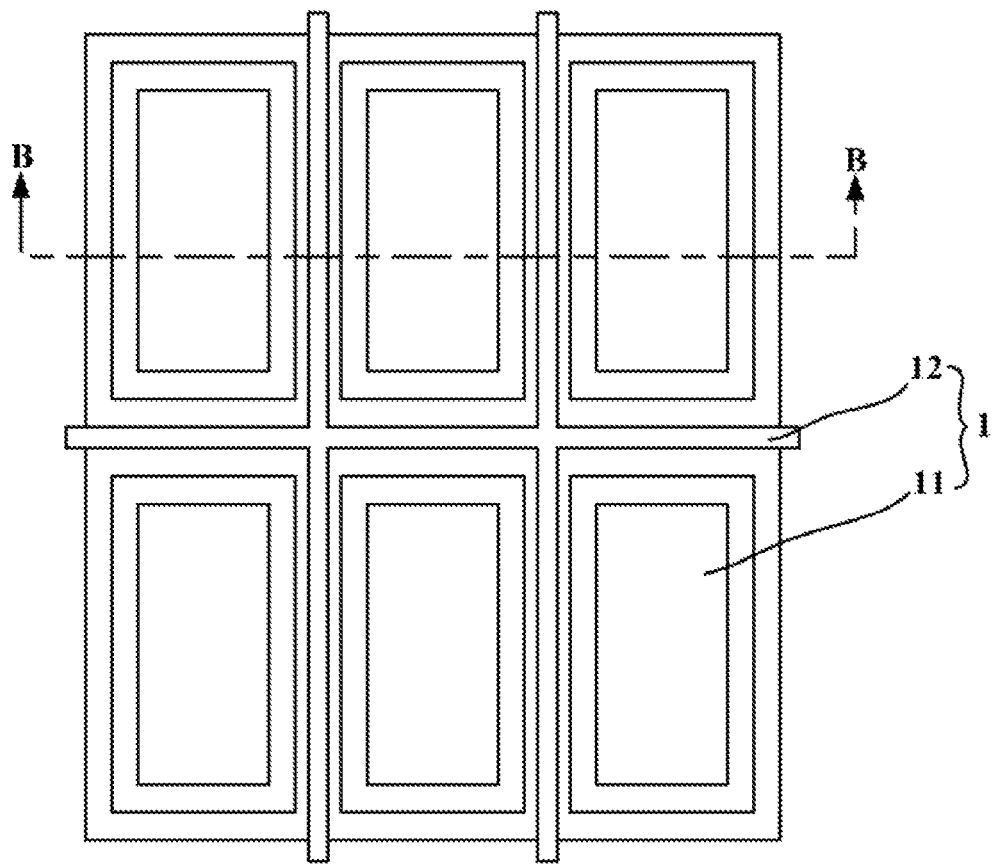
FIG. 9 is a top view of a photoresist layer according to some other embodiment of the present disclosure.
Figure 10:
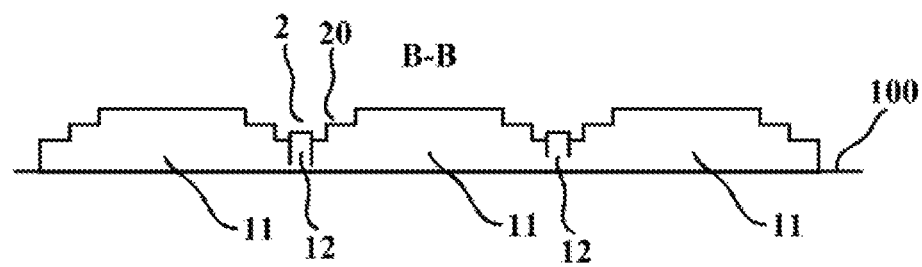
FIG. 10 is a schematic diagram of a cross section along a B-B direction of FIG. 9.

As illustrated in FIG. 9 and FIG. 10, in some embodiments, the photoresist layer 1 includes a plurality of color photoresists 11 and a black photoresist 12 arranged between two adjacent color photoresists 11; the lateral surface (s) of each of the plurality of recess parts 2 is (or are) constituted by the lateral surface (s) of the adjacent color photoresist (s) 11, and the bottom of each of the plurality of recess parts 2 is the black photoresist 12.

In the embodiments of the present disclosure, the lateral surface (s) of the color photoresist 11 is (or are) of a step-shaped design. When the photoresist layer 1 bends excessively, if the step at the bottom layer of the color photoresist 11 firstly generates cracks 4 as the step is under a greater stress, at this time, the step at the upper layer of the color photoresist 11 can cover the step at the bottom layer, so as to delay the propagation of cracks 4 and prolong the structural life of the photoresist layer 1.

Figure 11:
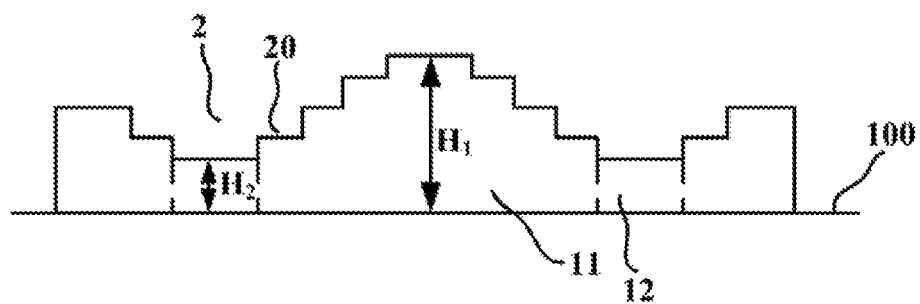
FIG. 11 is a schematic diagram of a cross section of a photoresist layer along the A-A direction of FIG. 2 according to an embodiment of the present disclosure.

As illustrated in FIG. 11, in the embodiments of the present disclosure, a maximum distance H1 between a surface of a side, facing away from the base substrate 100, of the color photoresist 11 and the base substrate 100 is greater than a distance H2 between a surface of a side, facing away from the base substrate 100, of the black photoresist 12 and the base substrate 100. By adopting this structural design, the number of the steps of each of the plurality of recess parts 2 increases equivalently, thus further prolonging the structural life of the photoresist layer 1.

In some embodiments of the present disclosure, as illustrated in FIG. 11, the number of the steps (or the height of the steps) of a lateral surface of each of the plurality of recess parts 2 is different from that of another lateral surface of each of the plurality of recess parts 2, i.e. the shape of each of the plurality of recess parts 2 as illustrated in FIG. 11 can be obtained in a patterning process by controlling different lateral surfaces of each of the plurality of recess parts 2 to have different numbers or different heights of the steps.

Figure 12:
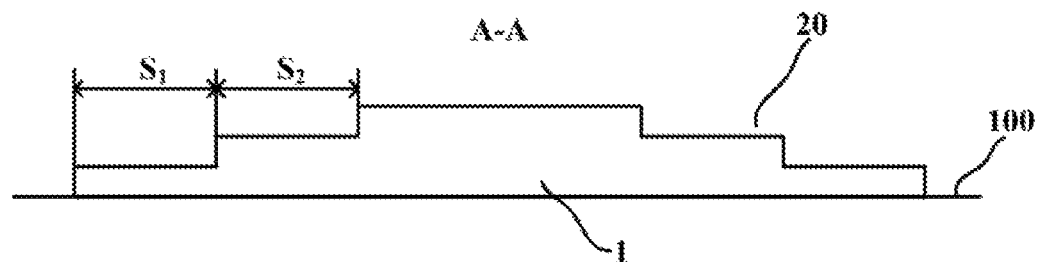
FIG. 12 is a structural schematic diagram of a step structure of a photoresist layer according to an embodiment of the present disclosure.

As illustrated in FIG. 12, in some embodiments of the present disclosure, an edge spacing S (such as S1 and S2 as illustrated in the figure) of two adjacent steps in the step structure (s) 20 shall satisfy a following formula: S>K/2, wherein K is an exposure deviation of the color photoresist when the photoresist layer 1 is manufactured. The exposure deviation is a deviation between a designed size and an actual size. When this condition is satisfied, the manufactured step structure (s) 20 can be layered clearly, and the process is easy to control. Further, masks of different light transmittances or different mask layers can be adopted to enable the exposure deviation between respective step layers to satisfy the formula: S>K/2.

Embodiments of the present disclosure further provide a liquid crystal display panel, including any of the color film substrate according to the technical solutions above. Since the photoresist layer of the color film substrate has the above beneficial effects, the color film substrate has a better structural strength and a longer service life.

Embodiments of the present disclosure further provide a liquid crystal display, including the liquid crystal display panel according to the technical solutions above. The structural strength of the photoresist layer of the color film substrate in the liquid crystal display is better; therefore, the liquid crystal display has an excellent flexibility and a higher product quality.

It shall be noted that, the embodiments above are merely used for illustrating the technical solution of the present disclosure, rather than limiting the present disclosure; although the present disclosure has been described in details according to the embodiments above, those ordinarily skilled in the art shall understand that, the technical solutions in the embodiments above can be modified, or equivalent substitutions can be made to part of the technical features in the technical solutions; and these modifications or substitutions will not make the essence of corresponding technical solutions depart from the spirit and scope of the technical solutions of respective embodiments of the present disclosure.

The invention claimed is:

1. A color film substrate, comprising a base substrate and a photoresist layer formed on the base substrate, wherein the photoresist layer comprises a plurality of recess parts, each of the plurality of recess parts has an opening facing away from the base substrate and a lateral surface with a step structure, and an orthographic projection of the opening of each of the plurality of recess parts onto the base substrate overlaps with an orthographic projection of a bottom of each of the plurality of recess parts onto the base substrate;

wherein a cross section of each of the plurality of recess parts paralleled with the base substrate shapes as a circle, an oval, or a triangle.

2. The color film substrate according to claim 1, wherein the photoresist layer comprises a plurality of color photoresists and a black photoresist arranged between two adjacent color photoresists; and the plurality of recess parts are arranged on the color photoresists; or the plurality of recess parts are arranged on the black photoresist; or the plurality of recess parts are arranged on the color photoresists and the black photoresist.

3. The color film substrate according to claim 1, wherein at least one recess part extends through the photoresist layer.

4. The color film substrate according to claim 1, wherein the plurality of recess parts constitute several recess part columns; and recess parts of two adjacent recess part columns are aligned with each other in a row direction, or the recess parts of two adjacent recess part columns are staggered with each other in a column direction.

5. The color film substrate according to claim 4, wherein when the recess parts of two adjacent recess part columns are staggered with each other in the column direction, spacing between two adjacent recess parts in each of the plurality of recess parts column is L, and the recess parts of two adjacent recess part columns are staggered by a distance of L/2 in the column direction.

6. The color film substrate according to claim 5, wherein spacing D between two adjacent recess part columns in a row direction is equal to $(\sqrt{3}/2)$ L.

7. The color film substrate according to claim 5, wherein spacing D between two adjacent recess part columns in a row direction is equal to $L*D_0/(2L_0)$, wherein $L_0$ is a size of a long edge of the photoresist layer, and $D_0$ is a size of a wide edge of the photoresist layer.

8. The color film substrate according to claim 1, wherein the photoresist layer comprises a plurality of color photoresists and a black photoresist arranged between two adjacent color photoresists; the lateral surface of each of the plurality of recess parts is constituted by a lateral surface of an adjacent color photoresist, and the bottom of each of the plurality of recess parts is the black photoresist.

9. The color film substrate according to claim 8, wherein a maximum distance between a surface of a side, facing away from the base substrate, of the color photoresist and the base substrate is greater than a distance between a surface of a side, facing away from the base substrate, of the black photoresist and the base substrate.

10. A liquid crystal display panel, comprising a color film substrate, wherein the color film substrate comprises a base substrate and a photoresist layer formed on the base substrate, wherein the photoresist layer comprises a plurality of recess parts; each of the plurality of recess parts has an opening facing away from the base substrate and a lateral surface with a step structure, and an orthographic projection of the opening of each of the plurality of recess parts onto the base substrate overlaps with an orthographic projection of a bottom of each of the plurality of recess parts onto the base substrate;

wherein a cross section of each of the plurality of recess parts paralleled with the base substrate shapes as a circle, an oval, or a triangle.

11. A liquid crystal display, comprising the liquid crystal display panel according to claim 10.

12. The liquid crystal display panel according to claim 10, wherein the photoresist layer comprises a plurality of color photoresists and a black photoresist arranged between two adjacent color photoresists; and the plurality of recess parts are arranged on the color photoresists; or the plurality of recess parts are arranged on the black photoresist; or the plurality of recess parts are arranged on the color photoresists and the black photoresist.

13. The liquid crystal display panel according to claim 10, wherein at least one recess part extends through the photoresist layer.

14. The liquid crystal display panel according to claim 10, wherein the plurality of recess parts constitute several recess part columns; and recess parts of two adjacent recess part columns are aligned with each other in a row direction, or the recess parts of two adjacent recess part columns are staggered with each other in a column direction.

15. The liquid crystal display panel according to claim 14, wherein when the recess parts of two adjacent recess part columns are staggered with each other in the column direction, spacing between two adjacent recess parts in each of the plurality of recess parts column is L, and the recess parts of two adjacent recess part columns are staggered by a distance of L/2 in the column direction.

16. The liquid crystal display panel according to claim 15, wherein spacing D between two adjacent recess part columns in a row direction is equal to $(\sqrt{3}/2)$ L; or the spacing D between two adjacent recess part columns in the row direction is equal to $L*D_0/(2L_0)$, wherein $L_0$ is a size of a long edge of the photoresist layer, and $D_0$ is a size of a wide edge of the photoresist layer.

17. The liquid crystal display panel according to claim 10, wherein the photoresist layer comprises a plurality of color photoresists and a black photoresist arranged between two adjacent color photoresists; the lateral surface of each of the plurality of recess parts is constituted by a lateral surface of an adjacent color photoresist, and the bottom of each of the plurality of recess parts is the black photoresist.

18. The liquid crystal display panel according to claim 17, wherein a maximum distance between a surface of a side, facing away from the base substrate, of the color photoresist and the base substrate is greater than a distance between a surface of a side, facing away from the base substrate, of the black photoresist and the base substrate.

\* \* \* \* \*